(12) United States Patent
Gupta et al.

(10) Patent No.: US 7,925,081 B2
(45) Date of Patent: Apr. 12, 2011

(54) SYSTEMS AND METHODS FOR HUMAN BODY POSE ESTIMATION

(75) Inventors: Abhinav Gupta, College Park, MD (US); Trista Pei-chun Chen, Menlo Park, CA (US); Francine R. Chen, Menlo Park, CA (US); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 789 days.

(21) Appl. No.: 11/955,270

(22) Filed: Dec. 12, 2007

(65) Prior Publication Data

US 2009/0154796 A1 Jun. 18, 2009

(51) Int. Cl.
*G06K 9/62* (2006.01)

(52) U.S. Cl. ........ 382/159; 382/106; 382/115; 382/116; 382/117; 382/118; 382/103; 382/285; 382/154; 382/168; 382/181; 382/184; 382/190; 700/29; 345/473; 345/474

(58) Field of Classification Search .................. 382/159, 382/106, 115, 116, 117, 118, 103, 285, 154, 382/168, 181, 184, 190; 700/29; 345/473, 345/474

See application file for complete search history.

(56) References Cited

U.S. PATENT DOCUMENTS

| | | | |
|---|---|---|---|
| 7,212,665 B2 | 5/2007 | Yang et al. | |
| 7,236,615 B2 | 6/2007 | Miller et al. | |
| 7,450,736 B2 * | 11/2008 | Yang et al. | 382/103 |
| 2006/0269145 A1 | 11/2006 | Roberts | |

OTHER PUBLICATIONS

Duda et al. Pattern Classification, New York: John Wiley & Sons, 2001, pp. 321-324 and 568-569, ISBN: 0-471-05669-3.
Jain, Fundamentals of Digital Image Processing, Prentice-Hall, Inc., Upper Saddle River, NJ, 1989, pp. 381-390, ISBN:0-13-336165-9.
Agarwal et al., "3D Human Pose From Silhouettes by Relevance Vector Regression," In CVPR 2004, http://eprints.pascal-network.org/archive/00000195/01/Agarwal-cvpr04.pdf.
Bassi et al., "Estimating True Changes When Categorical Panel Data Are Affected by Correlated and Uncorrelated Classification Errors; An Application to Unemployment Data," Sociological Methods and Research 29(2) (2000), 230-268.
Berg, A., "Human Pose Estimation from Images," http://www.cs.berkeley.edu/~aberg/pose.html, accessed Sep. 19, 2007.
Bissacco et al., "Fast Human Pose Estimation Using Appearance and Motion via Multi-Dimensional Boosting Regression," Proceedings of the 2007 IEEE Conference on Computer Vision and Pattern Recognition (CVPR 2007), Minneapolis, Jun. 2007.

(Continued)

*Primary Examiner* — Mike Rahmjoo
(74) *Attorney, Agent, or Firm* — Morgan, Lewis & Bockius LLP

(57) ABSTRACT

Systems and computer-implemented methods for use in body pose estimation are provided. Training data is obtained, where the training data includes observation vector data and corresponding pose vector data for a plurality of images. The observation vector data is representative of the images in observation space. The pose vector data is representative of the same images in pose space. Based on the training data, a model is computed that includes parameters of mapping from the observation space to latent space, parameters of mapping from the latent space to the pose space, and parameters of the latent space. The latent space has a lower dimensionality than the observation space and the pose space.

22 Claims, 12 Drawing Sheets

OTHER PUBLICATIONS

Bishop et al., "GTM: The Generative Topographic Mapping," Neural Computation, vol. 10, 215-234, Copyright © 1998 by The MIT Press.

Black et al., "Eigen Tracking: Robust Matching and Tracking of Articulated Objects Using a View-Based Representation," International Journal of Computer Vision; 1998; 26(1): 63-84.

Bray et al., "PoseCut: Simultaneous Segmentation and 3D Pose Estimation of Humans Using Dynamic Graph-Cuts," In the Proceedings of the Ninth European Conference on Computer Vision 2006, http://cms.brookes.ac.uk/staff/PhilipTorr/Papers/ECCV2006/PoseCut.pdf.

Carreira-Perpiñán et al., "A Review of Dimension Reduction Techniques," Technical Report CS-96-09, Dept. of Computer Science, University of Sheffield, UK, Jan. 27, 1997, http://citeseer.ist.psu.edu/cache/papers/cs/9059/http:zSzzSzwww.dcs.shef.ac.ukzSz~miguelzSzpaperszSzpszSzcs-96-09.pdf/a-review-of-dimension.pdf.

Chen et al., "Computer Vision on Multi-Core Processors: Articulated Body Tracking," Int'l Conf. on Multimedia and Expo, Beijing, China, Jul. 2007, http://www.fxpal.com/publications/FXPAL-PR-07-416.pdf.

Deutscher et al., "Articulated body motion capture by annealed particle filtering," In CVPR 2000, http://www.cs.berkeley.edu/~daf/appsem/Tracking/papers/cvpr.pdf.

Ek et al., Gaussian Process Latent, 4th Joint Workshop on Multimodal Interaction and Related Machine Learning Algorithms, Jun. 28-30, 2007, Brno, Czech Republic, http://www.carlhenrik.com/publications/files/mlmi2007/ek_mlmi2007_abstract.pdf.

Grochow et al., "Style-based inverse kinematics," International Conference on Computer Graphics and Interactive Techniques, ACM SIGGRAPH 2004, http://citeseer.ist.psu.edu/cache/papers/cs2/286/http:zSzzSzwww.dgp.toronto.eduzSzpaperszSzkgrochow_SIGGRAPH2004.pdf/grochow04stylebased.pdf.

Gupta et al., "Constraint integration for multi-view pose estimation of humans," Proceedings of the Third International Symposium on 3D Data Processing, Visualization, and Transmission (3DPVT'06), pp. 900-907 (2006).

Hou et al., "Real-time Body Tracking Using a Gaussian Process Latent Variable Model," © 2007 IEEE, http://dircweb.king.ac.uk/readinggroup/DIRCReadingGroupDocuments/Real-time%20Body%20Tracking%20Using%20a%20Gaussian%20Process%20Latent%20Variable%20Model.pdf.

Hua et al., "Learning to Estimate Human Pose with Data Driven Belief Propagation," IEEE Computer Society Conference on Computer Vision and Pattern Recognition, CVPR 2005, vol. 2, Jun. 20-25, 2005, pp. 747-754.

Hoff et al., "Latent Space Approaches to Social Network Analysis," Journal of the American Statistical Association, 97 (2002), pp. 1090-1098, http://citeseer.ist.psu.edu/cache/papers/cs/27189/http:zSzzSzwww.csss.washington.eduzSzPaperszSzwp17.pdf/hoff01latent.pdf.

Lawrence, "Gaussian Process Latent Variable Models for Visualization of High Dimensional Data", NIPS 2004, http://books.nips.cc/papers/files/nips16/NIPS2003_AA42.pdf.

Lawrence et al., "Local Distance Preservation in the GP-LVM through Back Constraints," ICML 2006, http://eprints.pascal-network.org/archive/00002607/01/backConstraints.pdf.

Roweis et al., "Nonlinear Dimensionality Reduction by Locally Linear Embedding," Science, vol. 290, Dec. 22, 2000.

Shakhnarovich et al., "Fast Pose Estimation With Parameter Sensitive Hashing," In ICCV 2003, http://people.csail.mit.edu/gregory/papers/iccv2003.pdf.

Shortreed, et al., "Positional Estimation within the Latent Space Model for Networks," University of Washington, Jan. 1, 2005, http://www.csss.washington.edu/Published/pwp1.pdf.

Sidenbladh et al., "Stochastic tracking of 3d human figures using 2d image motion," In ECCV 2000, http://cs.brown.edu/research/pubs/pdfs/2000/Sidenbladh-2000-STH.pdf.

Sigal et al., "Measure Locally Reason Globally: Occlusion-Sensitiver Articulated Pose Estimation," IEEE Conference on Computer Vision and Pattern Recognition, 2006, http://www.cs/brown.edu/~ls/Publications/cvpr2006sigal.pdf.

Sminchisescu et al., "Discriminative Density Propagation for 3d Human Motion Estimation," IEEE Computer Society Conference on Computer Vision and Pattern Recognition, CVPR 2005,, http://www.cs.toronto.edu/~crismin/PAPER/discriml_cvpr05.pdf.

Tenenbaum et al., "A global geometric framework for non-linear dimensionality reduction," Science, vol. 290, Dec. 22, 2000.

Urtasun et al., "3D People Tracking with Gaussian Process Dynamical Models," IEEE Conference on Computer Vision and Pattern Recognition (CVPR), New York, Jun. 2006, http://www.cs.toronto.edu/~fleet/research/Papers/urtasunCVPR06.pdf.

Urtasun et al., "Priors for people tracking from small training sets," IEEE International Conference on Computer Vision (ICCV), 2005, http://www.dgp.utoronto.ca/papers/rurtasun_ICCV2005.pdf.

Wang et al., "Gaussian Process Dynamical Models," In NIPS 2005, http://books.nips.cc/papers.files/nips18/NIPS2005_0548.pdf.

* cited by examiner

GPLVM

BC-GPLVM

OD-GPLVM

OD-GPLVM

SYSTEMS AND METHODS FOR HUMAN BODY POSE ESTIMATION

BACKGROUND OF THE INVENTION

1. Field of the Invention

Embodiments of the present invention relate to computer aided human body pose estimation.

2. Description of Related Art

Human body tracking (and more generally, human pose estimation) has many applications, including, but not limited to, visual surveillance, human computer interactions (e.g., gesture driven interfaces) and automated tutoring such as training a person how to imitate a movement. One problem of human body tracking/human pose estimation is to estimate the joint angles of a human body at any time. As can be appreciated from FIGS. 1A and 1B, an articulated human body can be thought of as including at least 10 body parts, which may require approximately 30 parameters to describe the full body articulation (left upper-arm can not be seen in FIG. 1A, but is represented in FIG. 1B). In other words, there is a desire to estimate the human pose in a 30+ dimensional space. This is one of the most challenging problems in the field of computer vision because of occlusion, a high dimensional search space and high variability in appearance due to human shape and clothing.

There is a wide range of approaches to human pose estimation. These algorithms can be broadly divided into two categories: discriminative approaches; and generative approaches. FIG. 2A is used to illustrate discriminative approaches, which estimate a pose by learning appearance based associative models to infer pose from image measurements. FIG. 2B is used to illustrate generative approaches, which estimates a pose by finding the pose that best explains the image observation. In FIG. 2B, the different models $212a \ldots n$ correspond to different values of y, where for generative approaches, the desire is to find the y that maximizes P(x|y), where x is the input image features.

Discriminative approaches involve learning a mapping from observation space to pose space. Here, an observation is a set of features characterizing an image of a person. Such a mapping is generally ambiguous in nature and hence requires multiple functions for mapping. The following papers, which are incorporated herein by reference, describe discriminative approaches to human pose estimation: Agarwal et al., entitled "3D Human Pose from Silhouettes by Relevance Vector Regression," in Computer Vision and Pattern Recognition (CVPR) 2004; Shakhnarovich et al., entitled "Fast pose estimation with parameter sensitive hashing," in IEEE International Conference on Computer Vision (ICCV) 2003; and Sminchisescu et al. entitled "Discriminative density propagation for 3d human motion estimation," in CVPR 2005.

On the other hand, mapping a current pose to an observation is a well defined problem in computer graphics. By building a mapping from pose space to observation space, generative approaches can search the pose space to find the pose that best-matches the current observations, e.g., using a likelihood model. The following papers, which are incorporated herein by reference, describe generative approaches to human pose estimation: Sigal et al., entitled "Measure Locally Reason Globally: Occlusion-sensitive Articulated Pose Estimation," in CVPR 2006; Gupta et al., entitled "Constraint integration for efficient multi-view pose estimation with self-occlusions" In IEEE Transactions on PAMI; and Sidenbladh et al., entitled "Stochastic tracking of 3d human figures using 2d image motion," in ECCV 2000.

While discriminative approaches are faster in nature as compared to generative approaches, generative approaches tend to generalize better because they are less constrained on a training pose dataset. However, generative approaches tend to be computationally infeasible because the search is in a high dimensional subspace. Nevertheless, while search or learning a prior model in a high dimensional space is infeasible, dimensionality reduction techniques can be used to embed the high-dimensional pose space to a low dimensional manifold. For example, Gaussian process latent variable models (GPLVM) provide a generative approach that has been used to model the pose-configuration space (Y) as a low dimensional manifold, and the search for the best configuration is performed in the low-dimensional latent space (Z). GPLVM is discussed in a paper by Lawrence entitled "Gaussian Process Latent Variable Models for Visualisation of High Dimensional Data," Conference on Neural Information Processing Systems (NIPS) 2004, which is incorporated herein by reference.

GPLVM, which at a high level is illustrated by FIG. 3, involves a smooth mapping from latent space (Z) to pose space (Y), and hence tries to keep two points that are far apart in pose space also far apart in latent space. GPLVM however fails to preserve the local distances in pose space, where preserving local distances implies keeping two close points in pose space as close points in latent space.

An extension to GPLVM, referred to as Back Constrained GPLVM (BC-GPLVM), or GP-LVM with back constraints, was presented in a paper by Lawrence et al. entitled "Local Distance Preservation in the GP-LVM through Back Constraints," ICML 2006, which is incorporated herein by reference. By constraining the points in the pose space to be mapped smoothly to the points in latent space, BC-GPLVM preserves local distances in the pose space. BC-GPLVM is illustrated at a high-level by FIG. 3B.

GPLVM and BC-GPLVM both only consider the pose space when finding a latent space. It would be beneficial to improve upon the GPLVM and BC-GPLVM techniques mentioned above. Such improved techniques would preferably provide faster inference approaches for human pose estimation, and better initialization for searches, as compared to GPLVM and BC-GPLVM.

SUMMARY OF THE INVENTION

Embodiments of the present invention generally relate to systems and computer-implemented methods for use in body pose estimation. In accordance with certain embodiments of the present invention, training data is obtained, where the training data includes observation vector data and corresponding pose vector data for multiple images. The observation vector data is representative of the images in observation space. The pose vector data is representative of the same images in pose space. Based on the training data, a model is computed that includes parameters of mapping from the observation space to latent space, parameters of mapping from the latent space to the pose space, and parameters of the latent space. The latent space has a lower dimensionality than the observation space, and the latent space has a lower dimensionality than the pose space. In accordance with certain embodiments, the parameters of the latent space include points in latent space that are embedded in the model, and that correspond to the training data.

In accordance with specific embodiments, further observation vector data is obtained, where the further observation vector data corresponds to a further image for which corresponding pose vector data is unknown. Based on the further observation vector data, a point in pose space is determined by using the model to perform mapping of the further observation data from observation space to latent space, and from latent space to pose space. A pose, that corresponds to the further observation vector data, can then be estimated based on the determined point in pose space.

The multiple images, for which observation vector data and corresponding pose vector data are obtained, can include a sequence of time ordered frames of video, each of which is associated with a point in time. Where this is the case, the model can be computed taking into account an image associated with a point in time, and one or more points in latent space corresponding one or more images associated with one or more previous points in time (e.g., an immediately preceding point in time). Additionally, where this is the case, when determining a point in pose space (for further observation vector data corresponding to a further image for which corresponding pose vector data is unknown), the point in pose space can be determined based on the further observation vector data and one or more point in latent space corresponding to one or more image associated with one or more point in time prior to the further image, again by using the model to perform mapping of the further observation data from observation space to latent space, and from latent space to pose space.

This description is not intended to be a complete description of, or limit the scope of, the invention. Alternative and additional features, aspects, and objects of the invention can be obtained from a review of the specification, the figures, and the claims.

BRIEF DESCRIPTION OF THE DRAWINGS

Preferred embodiment(s) of the present invention will be described in detail based on the following figures, wherein:

FIG. 5 also illustrates that OD-GPLVM computes points in latent space;

DETAILED DESCRIPTION OF THE INVENTION

Figure 1A:
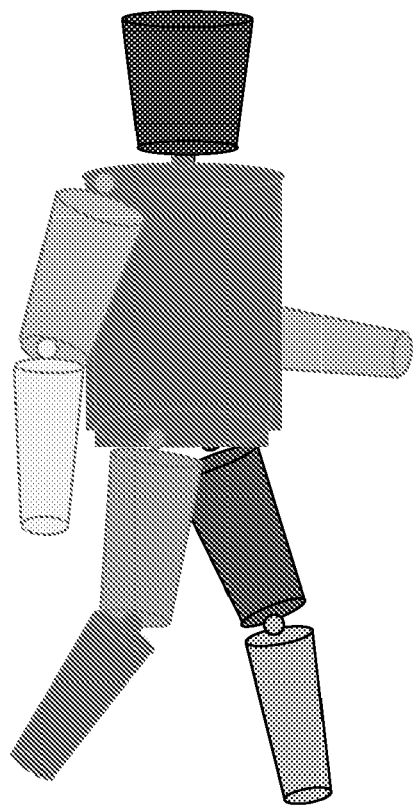
FIG. 1A illustrates how, for pose estimation purposes, an articulated human body can be thought of as including ten body parts.
Figure 1B:
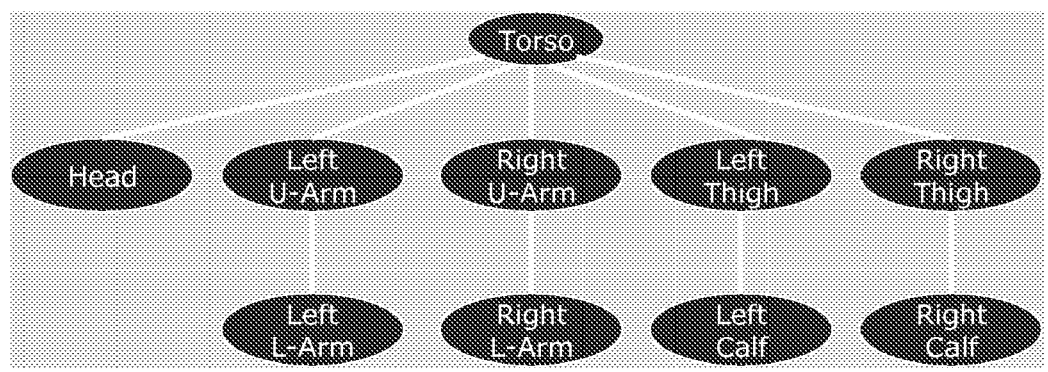
FIG. 1B shows how the ten body parts of FIG. 1A relate to one another.
Figure 2A:
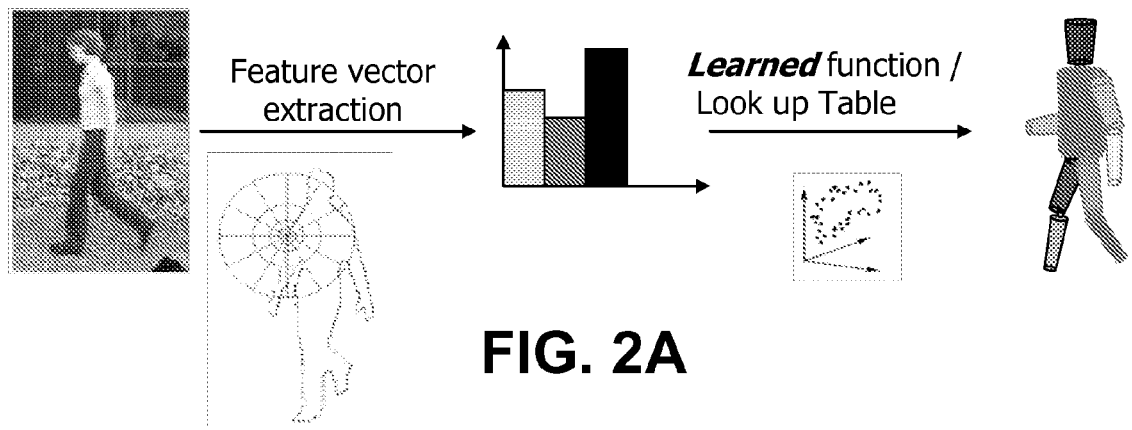
FIG. 2A is used to generally illustrate discriminative approaches to pose estimation.
Figure 2B:
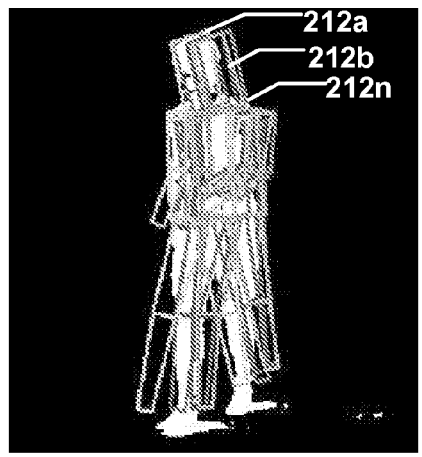
FIG. 2B is used to generally illustrate generative approaches to pose estimation.

GPLVM and BC-GPLVM, discussed above, only consider the pose space when finding the latent space. These approaches fail to consider the observation space when constructing the latent space. In contrast, specific embodiments of the present invention, which relate to what will be referred to as observation driven GPLVM (OD-GPLVM), provide an additional mapping from observation space to latent space, apart from the mapping from latent space to pose space used in GPLVM. Such an additional mapping has advantages, some of which are discussed below.

Because the OD-GPLVM according to embodiments of the present invention is a hybrid approach (i.e., it uses a discriminative mapping from observation space to latent space, and it uses the generative GPLVM model), OD-GPLVM provides a faster inference approach as compared to GPLVM and BC-GPLVM. Additionally, OD-GPLVM according to embodiments of the present invention provides a better initialization compared to GPLVM and BC-GPLVM when there is variable frame-rate or the dynamics are not reliable enough. This is because the initialization in OD-GPLVM can be based on observations, instead of the predictions from human dynamics.

Gaussian Process Dynamical Models (GPDM) is discussed in a paper by J. Wang et. al., entitled "Gaussian Process Dynamical Models," In NIPS 2005. Specific embodiments of the present invention provide an extension to Gaussian Process Dynamical Models (GPDM), where instead of having the mapping from latent space to latent space, there is a mapping from a combination of observation and latent space. Such a mapping provides a natural extension to tracking framework, which can roughly estimate the current frame latent position using previous frame(s) latent position(s) and the current observation.

As mentioned above, generative approaches to human body pose estimation try to search for the best pose in high dimensional pose space. Such a search can be formulated as a non-linear optimization problem, and approaches such as gradient descent can be used for finding the best pose estimate. However, gradient descent tends to get trapped in local minima. Approaches such as particle filtering can be used to overcome this problem. Particle filtering based approaches however generally fail to scale well in high dimensional space such as pose space. Particle filtering is discussed, e.g., in a paper by J. Deutscher et al. entitled "Articulated body motion capture by annealed particle filtering", In CVPR 2000, which is incorporated herein by reference.

One alternative is to reduce the dimensionality of the pose space by using dimensionality reduction approaches such as principal component analysis (PCA). This alternative is discussed, e.g., in a paper by M. J Black et al, entitled "Robust matching and tracking of articulated objects using a view based representation," IJCV, 1998, which is incorporated herein by reference. While human motion has an intrinsically low number of dimensions, linear subspace approaches are inappropriate due to the underlying non-linearity of the pose space. Non-linear dimensionality reduction approaches such as Isomaps and Local Linear Embedding have been used, but they are not appropriate since they do not provide mapping from low dimensional subspace to the high dimensional pose space. Isomaps are discussed, e.g., in a paper J. B. Tenenbaum, entitled "A global geometric framework for non-linear dimensionality reduction," Science 2000, which is incorporated herein by reference. Local Linear Embedding is discussed, e.g., in a paper by S Roweis et al., entitled "Nonlinear dimensionality reduction by locally linear embedding," Science 2000, which is incorporated herein by reference.

Lawrence proposed GPLVM as an approach to simultaneously learn a low dimensional embedding and a mapping from a low dimensional embedding to the high dimensional pose space. Urtasun et al. in a paper entitled "Priors for people tracking from small training sets," In ICCV 2005, proposed an approach for human body tracking using an extension of GPLVM, called Scaled GPLVM. Other extensions of GPLVM, such as GPDM and BC-GPLVM have also been used for human body tracking. GPDM is discussed in another paper by Urtasun et al. entitled "3D People Tracking with Gaussian Process Dynamical Models," In CVPR 2006 and is incorporated herein by reference. BC-GPLVM based tracking is discussed in a paper by Hou et al. entitled "Real-time Body Tracking Using a Gaussian Process Latent Variable Model," In ICCV 2007, which is incorporated herein by reference.

Technical Details

Figure 4:
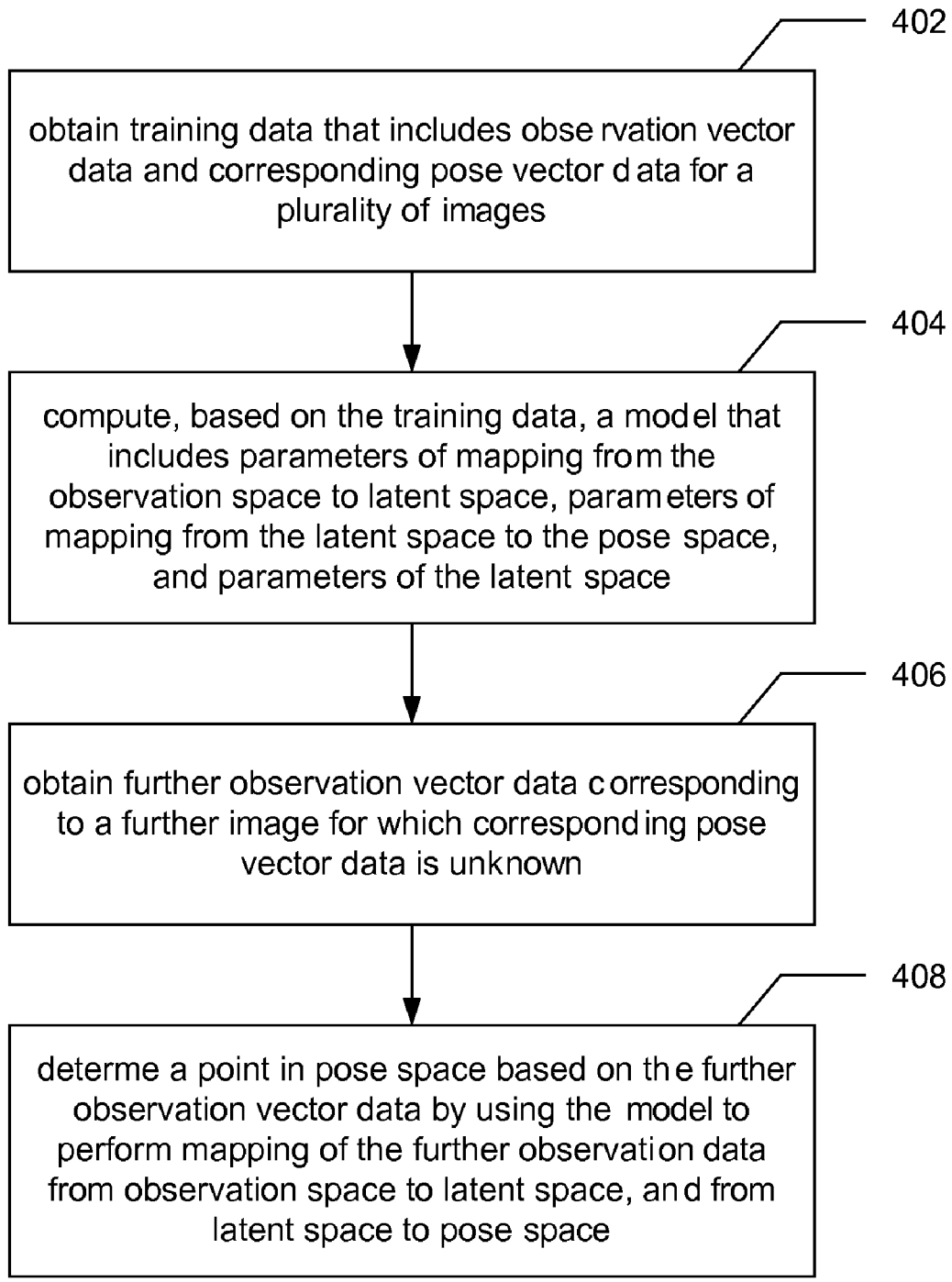
FIG. 4 is a high level flow diagram that is used to summarize various embodiments of the present invention.

FIG. 4 is a high level flow diagram that summarizes certain embodiments of the present invention. In FIG. 4, steps 402 and 404 related to a training process, and steps 406 and 408 relate to an inference process.

Referring to FIG. 4, at step 402, training data is obtained, where the training data includes observation vector data and corresponding pose vector data for multiple images. The observation vector data is representative of the images in observation space, and the pose vector data is representative of the same images in pose space. Such training data can be generated as desired, or preexisting training data can be used. For example, preexisting training data can be downloaded via the Internet from a university, such as Carnegie Mellon University, or any other source which makes such training data available to the public. For another example, training data can be obtained by simultaneously capturing image data and pose data from a marker-based motion capture system.

Still referring to FIG. 4, at a step 404, a model is computed, based on the training data, where the model includes parameters of mapping from the observation space to latent space, parameters of mapping from the latent space to the pose space, and parameters of the latent space. Observation space, as the term is used herein, is the state space of vectors that characterize features of a single image or features of multiple images (e.g., time ordered images that are frames of one or more sequence of video). The terms observation space and feature space are used interchangeably. Pose space, as the term is used herein, is the state space of vectors that characterize poses. Such pose space vectors can specify, e.g., joint angles and/or coordinates of body parts. Latent space, as the term is used herein, is a state space, of lower dimensionality than the observation space and lower dimensionality than the pose space, that represents underlying latent information of the training data. For one example, the observation space can have 100 dimensions, the latent space can have 2 dimensions, and the pose space can have 34 dimensions. This is just an example, which is not meant to be limiting. In specific embodiments, observation space has more dimensions that pose space. However, that need not be the case. In other words, it is possible that the pose space have the same number of dimensions as the observation space, or a greater number of dimensions than the observation space.

The model computed at step 404 includes parameters of mappings from observation space to latent space, and parameters of mapping from the latent space to pose space. In contrast, in GPLVM and BC-GPLVM (discussed above with reference to FIGS. 3A and 3B) the mappings are only between pose space and latent space. Additionally, the model computed at step 404 also includes parameters of the latent space, which as will be appreciated from the Equations discussed below, include points in latent space that are embedded in the model, and which correspond to the training data. Such parameters of the latent space are not predetermined, but rather, are computed as part of the model.

Figure 3A:
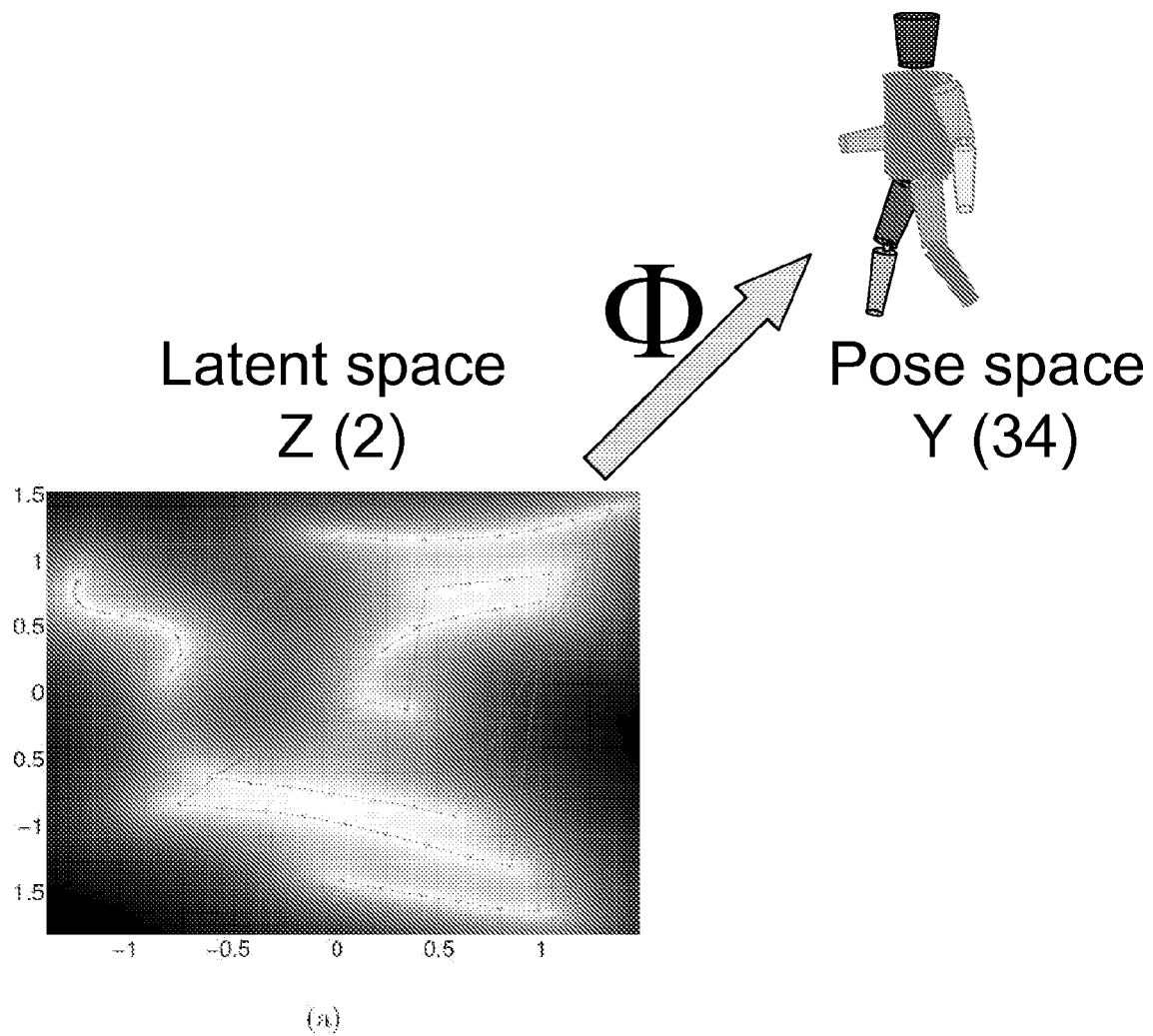
FIG. 3A is used to generally illustrate that a Gaussian Process Latent Variable Model (GPLVM) involves a mapping from latent space (Z) to pose space (Y)
Figure 3B:
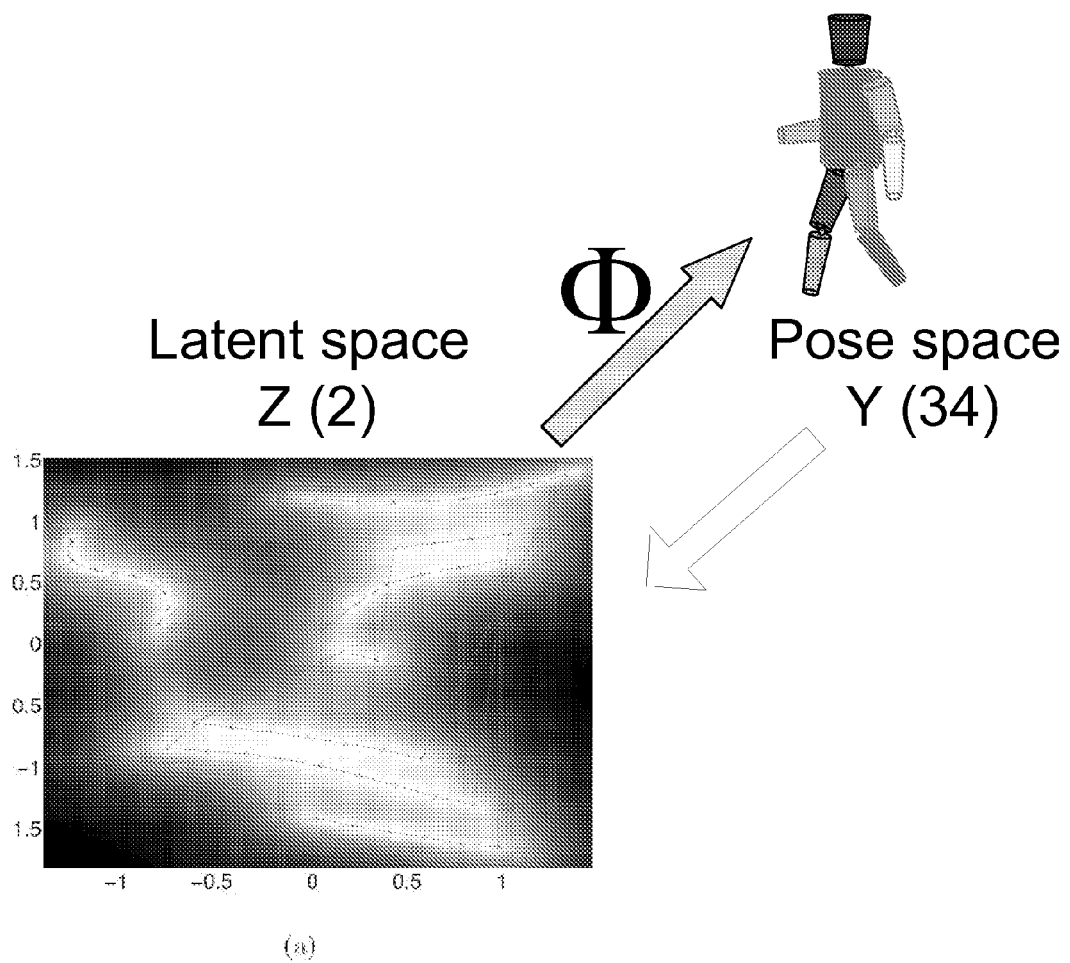
FIG. 3B is used to generally illustrate a Back Constrained Gaussian Process Latent Variable Model (BC-GPLVM) approach to pose estimation.
Figure 5:
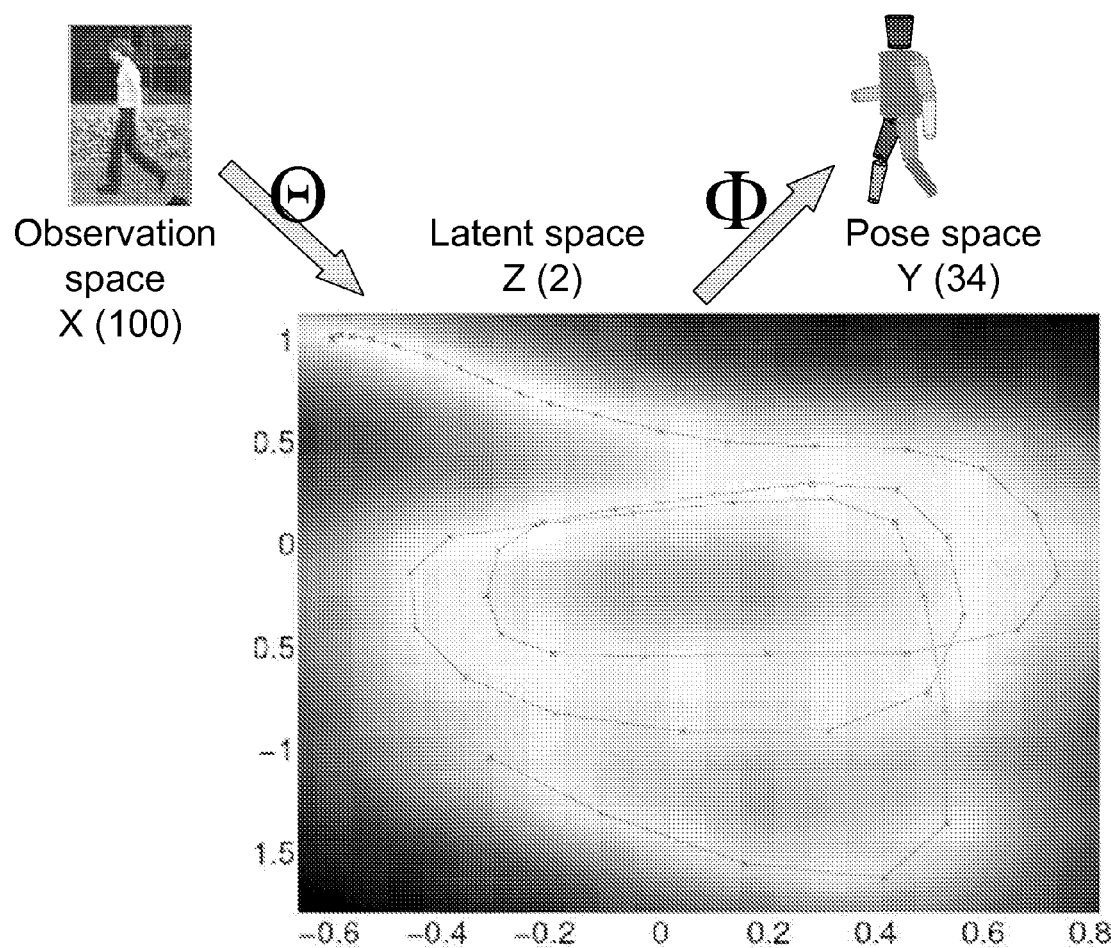
FIG. 5 is used to illustrate how Observation Driven GPLVM (OD-GPLVM creates two mappings, one from observation space (X) to a low-dimensional latent space (Z), and another from the low-dimensional latent space (Z) to pose space (Y), in accordance with specific embodiments of the present invention.

For illustration, let $Y=[y_1, \ldots, y_N]^T$ represent the training pose dataset (i.e., pose vector data for multiple training images). Similarly, let $X=[x_1, \ldots, x_N]^T$ represent the observations in feature space (i.e., observation vector data for the multiple training images). Additionally, let $Z=[z_1, \ldots, z_N]^T$ be the corresponding positions (also referred to as points) in the latent space. In terms of vectors, $y_i$ is a vector which defines the complete pose of a person in terms of joint angles or 3D positions of joints (dimensionality D=34 for the data used in the inventors' experiments), $z_i$ is the low dimensional latent point corresponding to $y_i$ (dimensionality Q=2 in the inventors' experiments) and x is the feature or observation point (dimensionality F=100 in the inventors' experiments). Referring to FIGS. 3A and 3B, the latent space (Z) is shown as having 2 dimensions, and the pose space (Y) is shown as having 34 dimensions. Referring to FIG. 5, the observation space (X) is shown as having 100 dimensions, the latent space (Z) is shown as having 2 dimensions, and the pose space (Y) is shown as having 34 dimensions.

Observation Driven GPLVM creates two mappings, one from observation space (X) to a low-dimensional latent space (Z), and another from the low-dimensional latent space (Z) to pose space (Y), as illustrated at a high level in FIG. 5. GPLVM estimates the latent space based on two considerations: the latent space should be a compact representation of pose space; and the latent space should be smooth. As the term is used herein, smooth means two 'close' points in the domain (latent space) will be mapped to two 'close' points in the range (pose space). In accordance with specific embodiments of the present invention, a model preserves the local distances in observation space as well as pose space. Such a preservation is likely to keep the latent points corresponding to two similar observations close to each other and therefore within a sampling range of each other. This enables latent space and pose space to be inferable from observation space.

Referring back to FIG. 4, after the model is computed at step 404 (i.e., after a trained model is generated), the trained model can be used to perform human body pose estimation. More specifically, at step 406 further observation vector data is obtained, where the further observation vector data corresponds to a further image for which corresponding pose vector data is unknown. Then, at step 408, the trained model is used to perform mapping of the further observation data from observation space to latent space, and from latent space to pose space, to thereby determine a point in pose space based on the further observation vector data. More specifically, step 408 can include a determination of a point in latent space based on the further observation vector data by using the model to perform mapping from observation space to latent space. Additionally, step 408 can include determining the point in pose space by using the model to perform mapping from latent space to pose space. A body pose can then be estimated based on the point in pose space. Additional details of steps 404-408, according to specific embodiments of the present invention, are described below. It is noted that after training steps 402 and 404 (which are used to compute the model) are performed, the pose estimation or inference steps 406 and 408 can be performed at any later time. In other words, once the model is obtained, pose estimation or inference can happen independently. It is also noted that after steps 402 and 404 are completed, steps 406 and 408 can occur multiple times without having to repeat steps 402 and 404.

Training Process

The computing of the model at step 404, also referred to as the training process, will now be described in additional detail. Given a training dataset of poses and observations (Y,X), the desired is to compute the model M={{$z_i$}, $\Phi$, $\Theta$}, where $\Phi$ and $\Theta$ are the parameters of mapping from Z to Y and X to Z respectively. More specifically, the parameters of the mapping from latent space to pose space are $\Phi \equiv (\alpha_\Phi, \gamma_\Phi, w_\Phi, \beta_\Phi)$, and the parameters of mapping from observation space to latent space are $\Theta \equiv (\alpha_\Theta, \gamma_\Theta, w_\Theta, \beta_\Theta)$. The posterior of M, P(M|Y, X), can be broken down using Bayes rule and assuming Y is independent of X given M as:

$$P(M \mid Y, X) \propto P(Y \mid M, X) P(M \mid X) \qquad (1)$$
$$= P(Y \mid M) P(M \mid X)$$
$$= P(Y \mid Z, \Phi) P(Z \mid X, \Theta) P(\Theta \mid X)$$

Under the Gaussian process model, the conditional density for the data is multivariate Gaussian and can be written as:

$$P(Y \mid Z, \Phi) = \frac{1}{\sqrt{2\pi^{ND} |K_Z|^D}} \exp\left(-\frac{1}{2} tr(K_Z^{-1} Y Y^T)\right) \qquad (2)$$

where $K_Z$ is the kernel matrix and the elements of the kernel matrix are defined by $k(z_i, z_j)$.

A Radial Basis Function (RBF) based kernel function can be used, which is given by:

$$k(z_i, z_j) = \alpha_\Phi \exp\left(\frac{-\gamma_\Phi}{2}(z_i - z_j) w_\Phi (z_i - z_j)^T\right) + \beta_\Phi \delta_{z_i, z_j} \qquad (3)$$

where $\delta$ is the Kronecker-delta function, as discussed in the paper by Lawrence entitled "Gaussian Process Latent Variable Models for Visualisation of High Dimensional Data," NIPS 2004, which was incorporated herein by reference above.

Similarly $P(Z|X, \Theta)$ can be written as:

$$P(Z \mid X, \Theta) = \frac{1}{\sqrt{2\pi^{NQ} |K_Z|^Q}} \exp\left(-\frac{1}{2} tr(K_X^{-1} Z Z^T)\right) \qquad (4)$$

where $K_X$ is the kernel matrix on X.

The elements of the kernel matrix $K_X$ can be defined as:

$$k(x_i, x_j) = \alpha_\Theta \exp\left(\frac{-\gamma_\Theta}{2}(x_i - x_j) w_\Theta (x_i - x_j)^T\right) + \beta_\Theta \delta_{x_i, x_j}. \qquad (5)$$

Assuming uniform priors on the parameters (i.e., $P(\Theta|X)$ is uniform), the log-posterior to be optimized can be obtained by taking the log of product of Equations 2 and 4, which results in Equation 6:

$$LP = \frac{-(D+Q)N}{2} \ln(2\pi) - \frac{D}{2} \ln|K_Z| - \qquad (6)$$
$$\frac{Q}{2} \ln|K_X| - \frac{1}{2} tr(K_Z^{-1} Y Y^T) - \frac{1}{2} tr(K_X^{-1} Z Z^T)$$

Equation 6 can be optimized, e.g., using a non-linear optimizer, such as scaled conjugate gradient (SCG), which is discussed in a book by Duda et al. entitled "Pattern Classification," ISBN 0-471-05669-3, which is incorporated herein by reference. The parameters for optimization are Z, $\Phi$ and $\Theta$. The optimization can be performed similar to the optimization performed in the paper by Lawrence entitled "Gaussian Process Latent Variable Models for Visualisation of High Dimensional Data," NIPS 2004, which was incorporated herein by reference above. For initialization, Z can be obtained using principal component analysis. An iterative approach can then be used to perform optimization over Z, $\Phi$ and $\Theta$, where the parameters can be updated using gradient equations. Equation 6.5 below, which is a derivative of Equation 6, is an example of such a gradient equation.

$$\frac{\partial LP}{\partial Z} = -K_x^{-1} Z + \frac{1}{2}(K_Z^{-1} Y^T Y K_Z^{-1} - DK_Z^{-1}) \frac{\partial K_Z}{\partial Z} \qquad (6.5)$$

Gradient equations for $dLP/d\Phi$ and $dLP/d\Theta$ can be similarly determined. Optimization over Z, $\Phi$ and $\Theta$ can be performed simultaneously. In one embodiment, none of Z, $\Phi$ and $\Theta$ are fixed, and optimization is performed over all three. Alternatively, using an iterative approach, one of Z, $\Phi$ and $\Theta$ can be initially obtained, e.g., using principal component analysis (PCA), another one can be fixed, and the log-posterior can be optimized over the third. Thereafter, one (or two) of Z, $\Phi$ and $\Theta$ can be fixed, while optimization is performed over the non-fixed one(s), where the parameters over which optimization is being performed is not dependent upon the fixed parameters. Optimization can be repeated until a specified criterion is satisfied. The criterion to be satisfied can be, e.g., that the iterative process was performed a certain number of times, that each of the three types of parameters were optimized a certain number of times, or that a change in parameters due to optimization from one iteration to a next changes by less than a certain amount.

Inference Process

Figure 6:
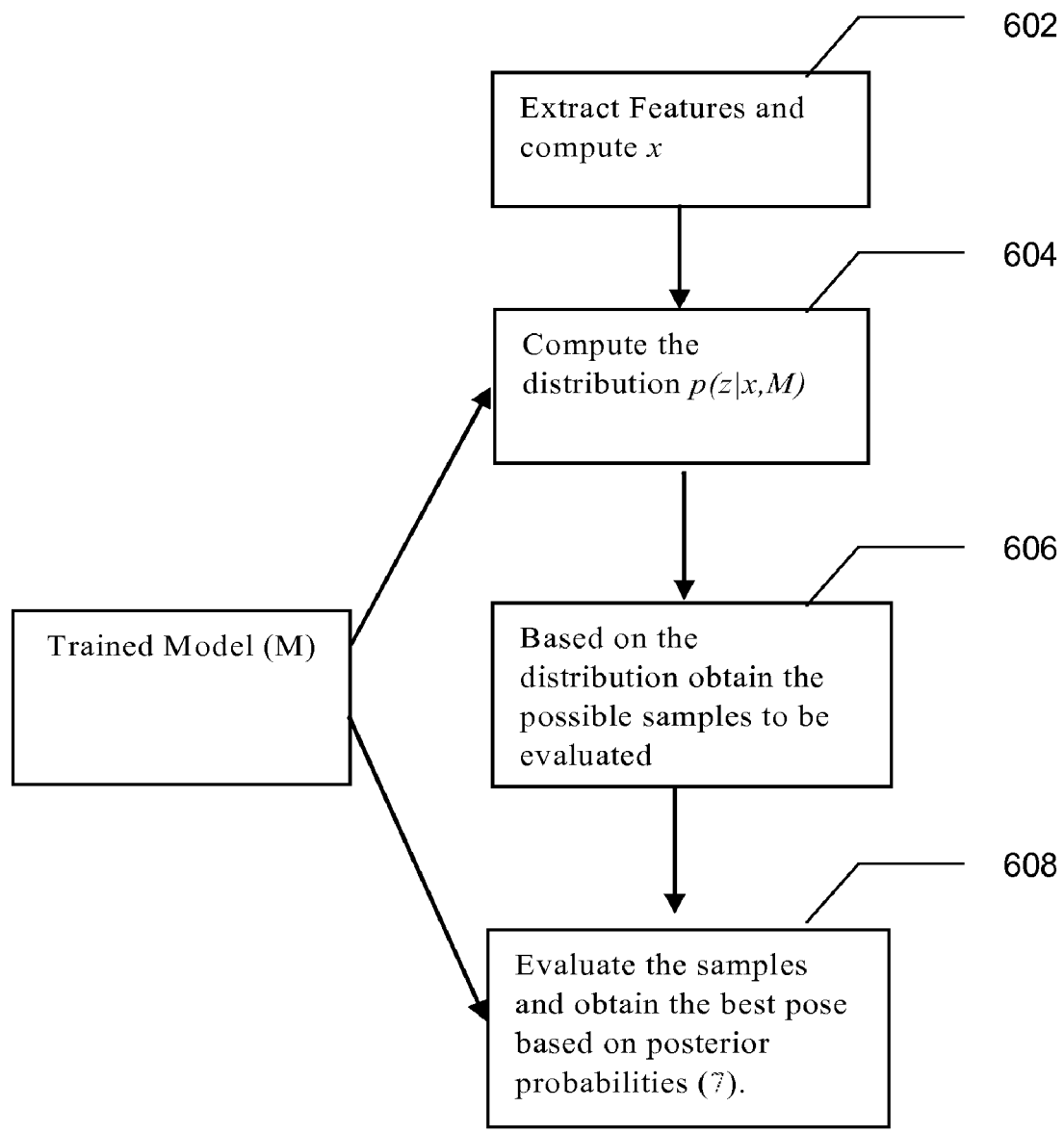
FIG. 6 is used to illustrate an inference process, according to an embodiment of the present invention.

To infer a pose, both the trained model M described above and further observation vector data (that corresponds to a further image) should be used. The inference process of steps 406 and 408 of FIG. 4, can alternatively be illustrated as shown in FIG. 6. To infer a pose in a frame (i.e., an image), the features are first extracted, as illustrated at 602. The features can be based on shape context histograms, e.g., similar to the histograms used in the paper by Agarwal et al., entitled "3D Human Pose from Silhouettes by Relevance Vector Regression," in CVPR 2004, which was incorporated herein by reference above. This results in observation vector data that corresponds to an image for which corresponding pose vector data is unknown.

Based on the features, discriminative mapping, described above in Equation 4, can be used to obtain the proposal distribution P(Z|x, M), as shown at 604. These proposal distributions can be used to obtain the samples in the latent space, as shown at 606. The samples can be obtained, e.g., using importance sampling. An exemplary importance sampling procedure is described in a paper by Srinivasan, entitled "Importance Sampling", New York: Springer, 2002, which is incorporated herein by reference. As shown at 608, samples can then be evaluated based on posterior probabilities, e.g., as defined by:

$$P(y, z | I, M) \propto P(I | y, z, M) P(y, z | M) \quad (7)$$
$$= P(I | y, M) P(y | z, M) P(z | M)$$

where I is the observed Image.

In Equation 7, the first term is the image likelihood, i.e., the probability of an image I. This can be computed, e.g., using a distance transformation approach. An exemplary distance transformation approach is described in Chapter 9 of a book by Jain, entitled "Fundamentals of Digital Image Processing," Prentice-Hall, 1989, which is incorporated herein by reference. The second term represents the probability of a pose y given a hypothesized latent space z, and the third term represents the probability of z given the trained model. From the paper by Lawrence entitled "Gaussian Process Latent Variable Models for Visualisation of High Dimensional Data, which was incorporated herein by reference above, it is known that P(y|z, M) is given by N(y, f(z), σ(z)), where f(z) and σ(z) is given by:

$$f(z) = \mu + Y^T K_Z^{-1} k(z)$$

$$\sigma^2(z) = k(z,z) - k(z)^T K_Z^{-1} k(z)$$

In Equation 7, for the third term, P(z|M) can be approximated by P(z|x, M). This can be computed using the mapping from observation space to latent space (X to Z).

Stated more generally, to determine a point in latent space, based on observation vector data for an observed image I with features x, a conditional probability distribution in latent space, P(z|x,M)) can be computed based on the observation vector data and the trained model. The posterior probability P(y,z|I,M) can then be computed for each z and corresponding y, and the point in pose space can be determined by using the model to perform mapping from the maximum a posterior estimation to pose space.

Alternatively, rather than determining the maximum a posterior estimation of the conditional probability distribution P(y,z|I,M), samples can be obtained from the computed conditional probability distribution, e.g., using importance sampling. A determination can then be made as to which of the samples has a greatest posterior probability. The point in pose space can then be determined by using the model to perform mapping from the sample (determined to have the greatest posterior probability) to pose space.

A single OD-GPLVM can be trained on many different motions, such as golf swings or kicking simultaneously. However, because the mappings from observation space to latent space and latent space to pose space can be ambiguous, it may be better to include several mappings from observation space to latent space, and to decide which mappings to use based on the current pose and contextual features such as environment.

Extension to Tracking

Gaussian Process Dynamical Model (GPDM) is a latent variable model that includes a low dimensional latent space, a mapping from latent space to pose space and a dynamical model in the latent space. Observation Driven GPLVM, in accordance with specific embodiments of the present invention, provides a natural extension to GPDM, which shall be referred to as Observation Driven GPDM (OD-GPDM). Instead of having a mapping from the observation space X to latent space Z, the latent position at time t is given by $$z^t = \psi(x^t, z^{t-1}) + \text{noise}$$

By having such a mapping, the current latent position can be regressed to using the current observation and the latent position of one or more previous frame(s). In other words, images associated with previous points in time can be used when determining mappings of the model, and when inferring a pose. The new likelihood function, LP' (of Equation 6' below), is similar to LP (of Equation 6 above), except that $K_X$ (of Equation 5 above) is replaced by $K_{XZ}$ and each element of $K_{XZ}$ (of Equation 5' below) is given by:

$$k(x_i, z_i, x_j, z_j) = \quad (5')$$
$$\alpha \exp\left\{\frac{-\gamma}{2}[(z_i - z_j)\omega(z_i - z_j)^T + (x_i - x_j)\omega'(x_i - x_j)^T]\right\} + \beta\delta_{XZ}$$

$$LP' = \frac{-(D+Q)N}{2}\ln(2\pi) - \frac{D}{2}\ln|K_Z| - \quad (6')$$
$$\frac{Q}{2}\ln|K_{XZ}| - \frac{1}{2}tr(K_Z^{-1} YY^T) - \frac{1}{2}tr(K_{XZ}^{-1} ZZ^T)$$

The inference procedure in the tracking framework for OD-GPDM is similar to the inference process explained above. The proposal distribution can be obtained using the current observations $x^t$ and one (or more) previous frame latent position $z^{t-1}$ ( ... $z^{t-i}$). Based on this proposal distribution, the samples which are evaluated using importance sampling can be obtained. The samples can be evaluated using the posterior probabilities given by:

$$P(y^t, z^t | I^{1:t}, M) \propto P(I^t | y^t, z^t, M) P(y^t | z^t, M) P(z^t | I^{1:t-1}, M) \quad (8)$$
$$= P(I^t | y^t, z^t, M) P(y^t | z^t, M)$$
$$\int_{z^{t-1}} P(z^t | z^{t-1}, M) P(z^{t-1} | I^{1:t-1}, M) dz^{t-1}$$
$$\approx P(I^t | y^t, z^t, M) P(y^t | z^t, M)$$
$$P(z^t | \hat{z}^{t-1}, I^{1:t-1}, M)$$
$$= P(I^t | y^t, z^t, M) P(y^t | z^t, M) P(z^t | \hat{z}^{t-1}, M) \cdot \kappa$$

where $\hat{z}^{t-1}$ can be defined as the maximum a posterior (MAP) estimate $$\hat{z}^{t-1} \equiv m = \underset{z^{t-1}}{\operatorname{argmax}} P(z^{t-1} | I^{1:t-1}, M).$$

In Equation 8, the last term is a constant for any choice of $y^t$ and $z^t$ and has been replaced by the constant term κ.

Stated more generally, where multiple images includes a sequence of time ordered frames of video (each of which is associated with a point in time), then the computing of a model that occurs at step 404 can be modified such that the computing of the model takes into account an image associated with a point in time, as well as point(s) in latent space corresponding to image(s) associated with previous point(s) in time, e.g., a point in latent space corresponding an image that is associated with an immediately preceding point in time. Further, when performing the inference process of steps 406 and 408, image(s) associated with previous point(s) in time can also be used. For example, at step 408, the trained model can be used to determine a point in pose space based on further observation vector data (corresponding to a further image) and point(s) in latent space corresponding to image(s) associated with point(s) in time prior to the further image for which pose estimation is being performed.

Evaluation

The inventors of the embodiments of the present invention have implemented OD-GPLVM and OD-GPDM described above and have tested their embodiments for sequences with motions such as walking and jumping jacks. The training data used was obtained from a motion capture website of Carnegie Mellon University (CMU). As of the filing date of this application, the training data was available http://mocap.cs.cmu.edu/. Alternative training data can also be used. For example, training data can be obtained using a motion capture process, an image capture process, and a supervised learning process the includes labeling of motion exemplars.

Figure 7:
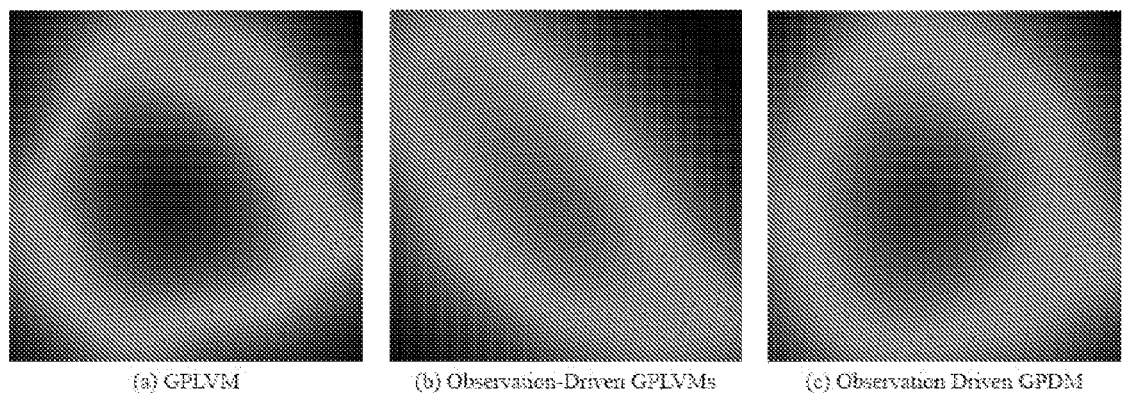
FIG. 7 illustrates training results for a walking sequence of 69 frames, when using GPLVM (a), when using OD-GPLVM (b) in accordance with embodiments of the present invention, and when using OD-GPDM (c) in accordance with embodiments of the present invention.

FIG. 7 shows the training results for a walking sequence of 69 frames, when using GPLVM (a), when using OD-GPLVM (b), and when using OD-GPDM (c). The dimensionality of latent space was set to 2. The sequence consists of two walk cycles which look similar in observations but are different in the pose space. By training a GPLVM using the above data, there are two folds (each fold is represented by cycles or loops of points in latent space) corresponding to each walk cycle. However, when training an OD-GPLVM, the two folds collapse into one since the two cycles look similar to each other. This is an useful property for observation driven search, since if two poses look similar they should preferably be within sampling range of each other. On training an OD-GPDM for the same dataset, it can be observed that the latent space includes the two folds, but they are very close to each other, and thus within sampling range of each other.

Figure 8:
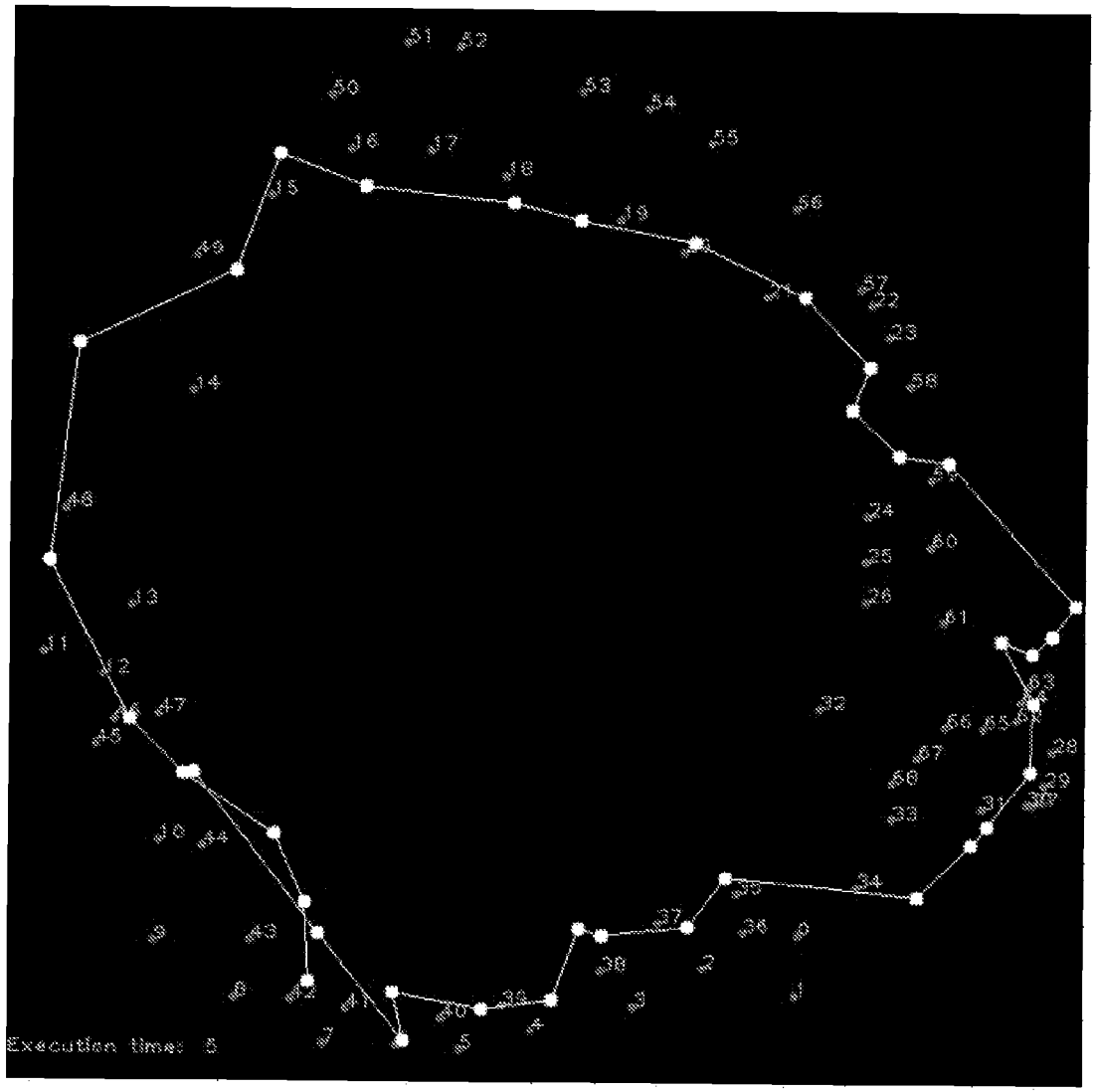
FIG. 8 shows the points in latent space that were determined when a model was computed based on the training data corresponding to a walking person.
Figure 9:
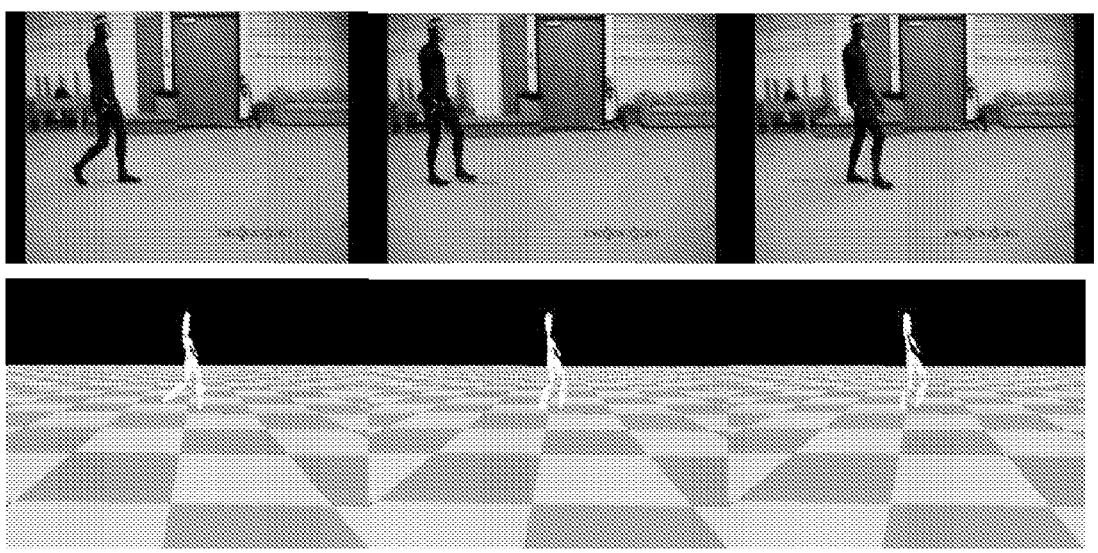
FIG. 9 shows a reconstructed skeleton using the mapping from latent space to pose space using the tracked latent positions of FIG. 8.

The trained OD-GPDM was also tested on a separate video consisting of a person walking. FIG. 8 shows the tracking results in latent space where a model was computed based on the training data for the person walking. In FIG. 8, the dots connected by lines illustrate tracking results in latent space, and the numbered dots illustrate z's from the training data (i.e., latent points from the training dataset). FIG. 9 shows a reconstructed skeleton using the mapping from latent space to pose space using the tracked latent positions. The discriminative module can be almost real-time with speeds up to 7 fps when run using an Intel Pentium 4, 3.4 GHz processor. The speed of the generative module depends on the number of samples generated using the importance sampling procedure. It is noted that other approaches, such as the approach described in the Sigal et al. paper entitled "Measure Locally Reason Globally: Occlusion-sensitive Articulated Pose Estimation," and the approach described in Gupta et. al paper entitled "Constraint Integration for efficient multi-view pose estimation with self-occlusions" (which papers were incorporated herein by reference above) take approximately 5 minutes and 45 seconds per frame, respectively, using Matlab.

The inventors also trained their model using jumping jack sequences, where the datasets were also obtained from the same motion capture website of Carnegie Mellon University.

Figure 10:
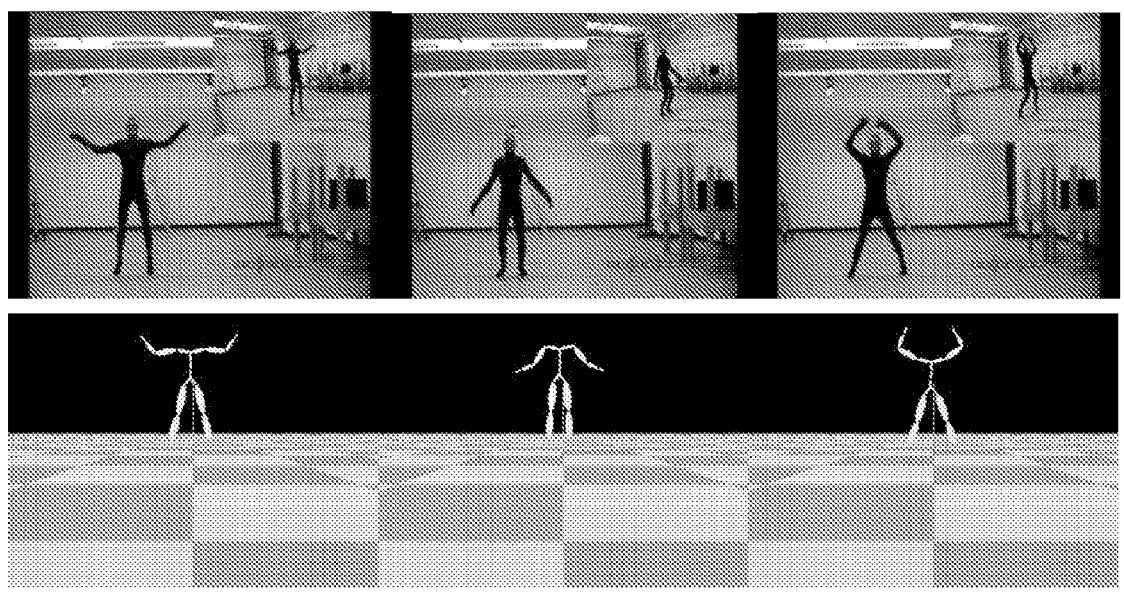
FIG. 10 shows a reconstructed skeleton using the mapping from latent space to pose space using the tracked latent positions determined when a model was computed based on training data corresponding to a person doing jumping jacks.

FIG. 10 shows a few results on another jumping jack sequence from the same dataset.

OD-GPLVM and OD-GPDM of embodiments of the present invention, and their application to the problem of human body pose estimation, are described above. Such approaches have advantages over previous approaches. For example, these approaches are hybrid in nature, and make latent space directly inferable from observation space, thereby providing a faster inference approach. Also, these approaches use observation to obtain initialization in the latent space. Therefore, such approaches out perform GPLVM and GPDM in scenarios where the frame rate of the video is variable or the dynamics are not reliable enough to provide reliable initialization if at all. Additionally, as with all the marker-less pose estimation methods and systems, embodiments of the present invention do not rely on markers to perform articulated human body tracking and pose estimation. Also, by preserving the local distances in observation space, the cost of a search for a best pose can be reduced since the search can be based on distances and gradients in the observation space.

It is believe that techniques of the present invention provide a faster inference approach for human pose estimation compared to the other contemporary techniques described above. This allows for applications where near real-time pose estimation is desired. Additionally, it is believed that techniques of the present invention achieve better initialization for search as compared to previous approaches, and hence are less likely get trapped in local minimas. The initialization, as described above, can be based on the combination of observations and weak prior from human dynamics. Additionally, when using techniques of the present invention, the subject whose pose is being tracked does not need to wear special markers on specific locations, thereby allowing for a wider range of possible applications such as surveillance for security or elderly monitoring.

Embodiments of present invention can be implemented using a conventional general purpose computer or a specialized computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD ROMs, microdrive, and magneto optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Figure 11:
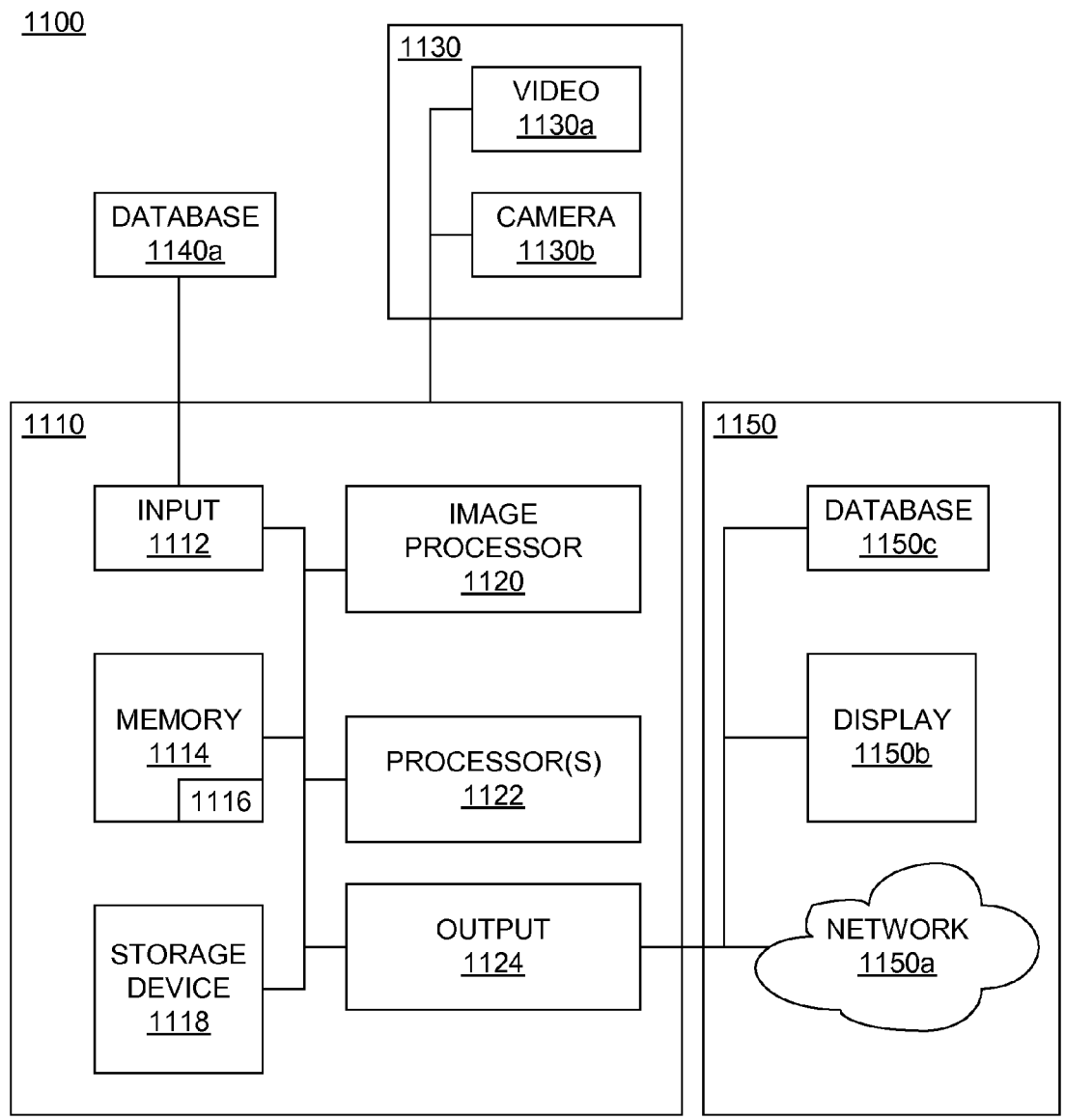
FIG. 11 is a high level block diagram of a system according to an embodiment of the present invention.

FIG. 11 shows a system 1100 according to an embodiment of the present invention, which is shown as including an input module 1112, a memory 1114, a storage device 1118, one or more processor(s) 1122, and an output module 1124. In an alternative embodiment, an image processor 1120 can be part of the main processor(s) 1122 or a dedicated device to perceive situations as digital images captured in a specified image format. Similarly, the memory 1114 can be a standalone memory device (e.g., a random access memory (RAM) chip, flash memory, or the like) and/or a memory on-chip with processor 1122 (e.g., cache memory). The storage device 1118 can be, e.g., a hard disk, DVD-R/RW, CD-R/RW or RAM, but is not limited thereto. The computer system 1110 can be a stand-alone system, such as, a server, a personal computer, or the like, or can be part of a larger system, for example, a security system having a vision system.

In accordance with an embodiment, the input module 1112 receives digital images from an image source, such as a database 1140, the memory 1114 or the storage device 1118. Additionally, or alternatively, the input module 1112 can receive digital images directly from an imaging device 1130, for example, a digital camera 1130a, a video system 1130b (e.g., a closed circuit television), an image scanner, etc. Additionally, or alternatively, the input module 1112 can be an interface to receive information from a network system, for example, another database, another vision system, Internet servers, or the like. The network interface may be a wired interface, such as, but not limited to, a USB, RS-232 serial port, Ethernet card, or the like, or can be a wireless interface module, such as, a wireless device configured to communicate using a wireless protocol, e.g., Bluetooth, WiFi, IEEE 802.11, or the like. The image processor 1120 can be used to pre-process the digital images received through the input module 1112 to convert the digital images to the preferred format on which the processor(s) 1122 operates.

Information can be stored in the memory 1114 and processed by the processor(s) 122. The processor(s) 1122 can apply a set of instructions that when executed perform one or more of the methods according to the present invention, described in detail above. The memory 1114 can, e.g., include a module of instructions 1116 for implementing such methods.

The processor(s) 1122 can output information through an output module 1124 to an external device 1150, e.g., a network element or server 1150a, a display device 1150b, a database 1150c, or the like. As with the input module 1112, the output module 1124 can be wired or wireless. The output module 1124 can be a storage drive interface, (e.g., hard-drive or optical drive driver), a network interface device (e.g., an Ethernet interface card, wireless network card, or the like), or a display driver (e.g., a graphics card, or the like), or any other such device for outputting the information determined.

Table 1 below includes a listed of symbols used herein and their meanings.

TABLE 1

List of symbols used

Meaning/Physical Significance

| Symbol | |
|---|---|
| I | Image Observations |
| Y | Training dataset of pose vectors |
| X | Training dataset of feature vectors |
| M | Parameters of OD-GPLVM model |
| Z | Corresponding latent points for the training dataset |
| φ | Parameters for mapping from latent space (Z) to pose space(Y) |
| Θ | Parameters for mapping from observation space (X) to latent space(Z) |
| $K_Z$ | Kernel Matrix based on Z |
| $K_X$ | Kernel Matrix on X |
| N | Number of training data examples |
| D | Dimensionality of Y |
| Q | Dimensionality of Z |
| N( ) | Normal function |
| tr( ) | Trace of a Matrix |
| RBF Parameters | |
| α | Variance of RBF |
| γ | Inverse kernel width |

TABLE 1-continued

List of symbols used

Meaning/Physical Significance

| | |
|---|---|
| w | Weight vector for the dimensions in latent space |
| β | Noise variance |

Table 2 below, includes a list of many of the abbreviations used herein and their meanings.

TABLE 2

List of Abbreviations used

| Abbreviations | Meaning/Physical Significance |
|---|---|
| GPLVM | Gaussian Process Latent Variable Model |
| GPDM | Gaussian Process Dynamical Model |
| BC-GPLVM | Back-Constrained Gaussian Process Latent Variable Model |
| OD-GPLVM | Observation Driven Gaussian Process Latent Variable Model |

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The above mentioned part numbers are exemplary, and are not meant to be limiting. Accordingly, other parts can be substituted for those mentioned above.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed:

1. A computer-implemented method for use in body pose estimation, comprising:

(a) obtaining training data that includes observation vector data and corresponding pose vector data for a plurality of images,
  wherein the observation vector data is representative of the images in observation space, and the pose vector data is representative of the same images in pose space; and (b) computing, based on the training data, a model that includes parameters of mapping from the observation space to latent space, parameters of mapping from the latent space to the pose space, and parameters of the latent space;
  wherein the latent space has a lower dimensionality than the observation space, and
  wherein the latent space has a lower dimensionality than the pose space.

2. The method of claim 1, wherein the parameters of the latent space, that are computed at step (b), include points in latent space that are embedded in the model.

3. The method of claim 1, wherein the parameters of the latent space, that are computed at step (b), correspond to the training data.

4. The method of claim 1, wherein step (b) includes:
(b.1) performing principal component analysis, based on the pose vector data of the training data, to obtain an initial projection of points in latent space; and
(b.2) performing optimization of the parameters of latent space, the parameters of mapping from observation space to latent space, and the parameters of mapping from latent space to pose space.

5. The method of claim 4, wherein step (b) also includes:
(b.3) repeating step (b.2) until a specified criterion is satisfied.

6. The method of claim 1, further comprising:
(c) obtaining further observation vector data corresponding to a further image for which corresponding pose vector data is unknown; and
(d) determining a point in pose space based on the further observation vector data by using the model to perform mapping of the further observation data from observation space to latent space, and from latent space to pose space.

7. The method of claim 6, further comprising:
(e) estimating a pose, that corresponds to the further observation vector data, based on the point in pose space determined at step (d).

8. The method of claim 6, wherein step (d) comprises:
(d.1) determining a point in latent space based on the further observation vector data by using the model to perform mapping from observation space to latent space; and
(d.2) determining the point in pose space by using the model to perform mapping from the point in latent space to pose space.

9. The method of claim 8, wherein:
step (d.1) includes
  (d.1.i) computing a conditional probability distribution in latent space based on the further observation vector data and the model; and
  (d.1.ii) determining a maximum a posterior estimation of the conditional probability distribution computed at (d.1.i); and
step (d.2) includes determining the point in pose space by using the model to perform mapping from the maximum a posterior estimation, determined at (d.1.ii), to pose space.

10. The method of claim 8, wherein:
step (d.1) includes
  (d.1.i) computing a conditional probability distribution in latent space based on the further observation vector data and the model;
  (d.1.ii) obtaining a plurality of samples from the computed conditional probability distribution; and
  (d.1.iii) determining which of the plurality of samples has a greatest posterior probability; and
step (d.2) includes determining the point in pose space by using the model to perform mapping from the sample, determined at (d.1.iii) to have the greatest posterior probability, to pose space.

11. The method of claim 1, wherein:
the plurality of images includes a sequence of time ordered frames of video, each of which is associated with a point in time; and
at step (b) the computing of the model takes into account
an image associated with a point in time, and
one or more point in latent space corresponding one or more image associated with one or more previous point in time.

12. The method of claim 11, wherein at step (b) the computing of the model takes into account
an image associated with a point in time, and
a point in latent space corresponding an image that is associated with an immediately preceding point in time.

13. The method of claim 11, further comprising:
(c) obtaining further observation vector data corresponding to a further image for which corresponding pose vector data is unknown; and
(d) determining a point in pose space, based on the further observation vector data and one or more point in latent space corresponding to one or more image associated with one or more point in time prior to the further image, by using the model to perform mapping of the further observation data from observation space to latent space, and from latent space to pose space.

14. The method of claim 13, wherein step (d) comprises:
(d.1) determining a point in latent space based on the further observation vector data and the one or more point in latent space corresponding to one or more image associated with one or more point in time prior to the further image, by using the model to perform mapping from observation space to latent space; and
(d.2) determining the point in pose space by using the model to perform mapping from latent space to pose space.

15. The method of claim 14, wherein:
step (d.1) includes
  (d.1.i) computing a conditional probability distribution in latent space based on the further observation vector data, the one or more point in latent space corresponding to the one or more image associated with one or more point in time prior to the further image, and the model; and
  (d.1.ii) determining a maximum a posterior estimation of the conditional probability distribution computed at (d.1.i); and
step (d.2) includes determining the point in pose space by using the model to perform mapping from the maximum a posterior estimation, determined at (d.1.ii), to pose space.

16. The method of claim 14, wherein:
step (d.1) includes
  (d.1.i) computing a conditional probability distribution in latent space based on the further observation vector data, the one or more point in latent space corresponding to the one or more image associated with one or more point in time prior to the further image, and the model;
  (d.1.ii) obtaining a plurality of samples of the computed conditional probability distribution; and
  (d.1.iii) determining which of the plurality of samples has a greatest posterior probability; and
step (d.2) includes determining the point in pose space by using the model to perform mapping from the sample, determined at (d.1.iii) to have the greatest posterior probability, to pose space.

17. A system for use in body pose estimation, comprising:
an input module configured to obtain training data that includes observation vector data and corresponding pose vector data for a plurality of images,
  wherein the observation vector data is representative of the images in observation space, and the pose vector data is representative of the same images in pose space; and
one or more processor configured to compute, based on the training data, a model that includes parameters of mapping from the observation space to latent space, parameters of mapping from the latent space to the pose space, and parameters of the latent space;
wherein the latent space has a lower dimensionality than the observation space, and
wherein the latent space has a lower dimensionality than the pose space.

18. The system of claim 17, wherein:
the input module is also configured to obtain further observation vector data corresponding to a further image for which corresponding pose vector data is unknown; and
the one or more processor is also configured to
determine a point in pose space based on the further observation vector data by using the model to perform mapping of the further observation data from observation space to latent space, and from latent space to pose space, and
estimate a pose, that corresponds to the further observation vector data, based on the determined point in pose space.

19. The system of claim 17, wherein:
the plurality of images includes a sequence of time ordered frames of video, each of which is associated with a point in time; and
the one or more processor is configured to compute the model taking into account an image associated with a point in time, and one or more point in latent space corresponding one or more image associated with one or more previous point in time.

20. A computer program product, comprising a non-transitory computer-readable medium having computer program instructions embodied thereon to cause one or more processor to implement a method for use in body pose estimation, the method comprising:
obtaining training data that includes observation vector data and corresponding pose vector data for a plurality of images,
wherein the observation vector data is representative of the images in observation space, and the pose vector data is representative of the same images in pose space; and
computing, based on the training data, a model that includes parameters of mapping from the observation space to latent space, parameters of mapping from the latent space to the pose space, and parameters of the latent space;
wherein the latent space has a lower dimensionality than the observation space, and
wherein the latent space has a lower dimensionality than the pose space.

21. The computer program product of claim 20, wherein the method further comprises:
obtaining further observation vector data corresponding to a further image for which corresponding pose vector data is unknown;
determining a point in pose space based on the further observation vector data by using the model to perform mapping of the further observation data from observation space to latent space, and from latent space to pose space; and
estimating a pose, that corresponds to the further observation vector data, based on the determined point in pose space.

22. The computer program product of claim 20, wherein:
the plurality of images includes a sequence of time ordered frames of video, each of which is associated with a point in time; and
wherein the computing of the model takes into account an image associated with a point in time, and one or more point in latent space corresponding one or more image associated with one or more previous point in time.

* * * * *